United States Patent [19]  [11]  4,418,834
Helms et al.  [45]  Dec. 6, 1983

[54] OVERCAP RING WITH AN INTEGRAL PEELABLE LAMINATED STRUCTURE

[75] Inventors: Charles R. Helms, Malvern; Richard L. Bell, Exton, both of Pa.

[73] Assignee: Container Corporation of America, Chicago, Ill.

[21] Appl. No.: 416,948

[22] Filed: Sep. 13, 1982

[51] Int. Cl.³ .............................................. B65D 41/00
[52] U.S. Cl. ..................................... 220/359; 229/5.5; 229/5.7; 229/43; 215/232
[58] Field of Search ............... 220/359, 256, 257, 258; 215/232; 229/43, 5.5, 5.6, 5.7

[56] References Cited

U.S. PATENT DOCUMENTS 4,094,460 6/1978 Scanga et al. .......................... 229/43
4,171,084 10/1979 Smith .................................. 215/232
4,266,687 5/1981 Cummings ........................... 215/232
4,359,169 11/1982 Helms et al. ......................... 220/359

Primary Examiner—George T. Hall
Attorney, Agent, or Firm—Richard W. Carpenter; Davis Chin

[57] ABSTRACT

A closure assembly for a container body comprising an overcap ring and an integral, peelable laminated structure consisting of a paperboard substrate, an electrically conductive layer, a first coating layer, and a second coating layer. The overcap ring with the laminated structure are adapted to be induction heat sealed to the container body.

15 Claims, 7 Drawing Figures

OVERCAP RING WITH AN INTEGRAL PEELABLE LAMINATED STRUCTURE

BACKGROUND OF THE INVENTION

1. Field of the Invention

This invention relates generally to closure arrangements and more particularly, it relates to an overcap ring with an integral laminated structure for sealing of containers made of paperboard, metal, glass, plastic and the like.

2. Description of the Prior Art

There are generally known a number of alternate membrane-type closures for closing containers and/or induction heat sealing of membrane-type closures to containers from the prior art of which the following U.S. Pat. Nos. are representative: 2,620,939; 2,646,183; 3,317,068; 3,383,256; 3,474,952; 3,723,212; 3,798,094; 3,892,351; 3,909,326; 3,973,719; 4,044,941; 4,094,460; 4,157,147; 4,171,084.

However, none of the prior art listed above disclosed an overcap ring having an integral peelable laminated structure like that of the present invention which is adapted to be heat sealed to a container body.

SUMMARY OF THE INVENTION

Accordingly, it is a general object of the present invention to provide a new and improved closure arrangement for a container.

It is another object of the present invention to provide an overcap ring with an integral peelable laminated structure adapted for engagement with a container body.

It is another object of the present invention to provide a laminated structure consisting of a paperboard substrate, an electrically conductive layer, a first coating layer and a second coating layer which is injection molded with an overcap ring.

BRIEF DESCRIPTION OF THE DRAWINGS

These and other objects and advantages of the present invention will become more fully apparent from the following detailed description when read in conjunction with the accompanying drawings wherein.

DETAILED DESCRIPTION OF THE PREFERRED EMBODIMENTS

Figure 1:
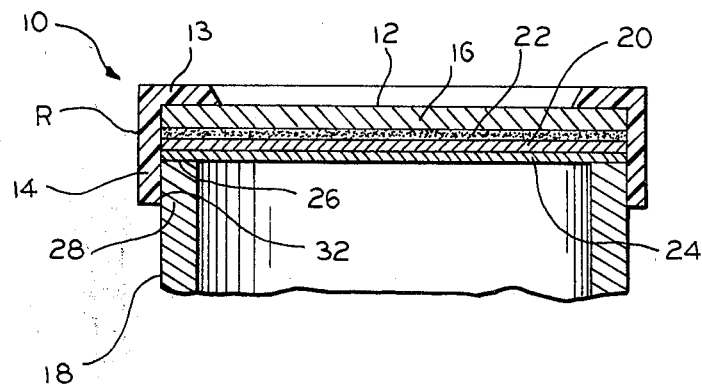
FIG. 1 is a cross-sectional view of the closure assembly secured to a container in accordance to the present invention.

Referring now in detail to the drawings, there is shown in FIG. 1 the closure arrangement 10 consisting of an overcap ring R and an integral peelable laminated structure 12. The overcap ring R includes a generally planar portion 13 and a downwardly depending flange portion 14 adapted to fit around the outside of a container body 18. The overcap ring R and the laminated structure 12 are made to be a finished single-piece molded closure arrangement by insert injection molding. The closure arrangement 10 is adapted to be induction heat sealed to the container body 18. While the closure arrangement 10 and container body 18 are illustrated as circular in shape, it should be understood that other shapes such as oval or generally rectangular are possible.

The laminated structure 12 is comprised of a paperboard layer or primary substrate 16 and an electrically conductive layer such as a metal foil disc 20 having first and second surfaces. The foil disc 20 has a first coating layer 22 on the first surface thereof which facilitates bonding to the undersurface of the paperboard substrate 16. The first surface of the coating layer 22 is bonded to the first surface of the foil disc 20, and the second surface of the coating layer 22 is the one bonded to the undersurface of the layer 16. The foil disc 20 also has a second coating layer 24 on the second surface thereof which will become sealed to the mouth open end of the container body 18 at its rim 26. The first surface of the coating layer 24 is bonded to the second surface of the foil disc 20, and the second surface of the coating layer 24 is adapted for heat sealing to the rim 26.

The first coating layer 22 may be either a weak adhesive or a tacky wax film which depends on whether the foil disc 20 is to be removed from the container with the overcap ring or whether it is to remain on the container when the overcap ring is removed. The second coating layer 24 is a heat sealing material which may be either a releasable type or a peelable, low density polyethylene. The selection of the material for use in the coating layer 24 is dependent upon the material of the container and whether the coating layer 24 is to remain inside the overcap ring or to remain on the container when the overcap ring is removed. All of the above combinations are envisioned to be within the scope of the present invention.

Figure 2:
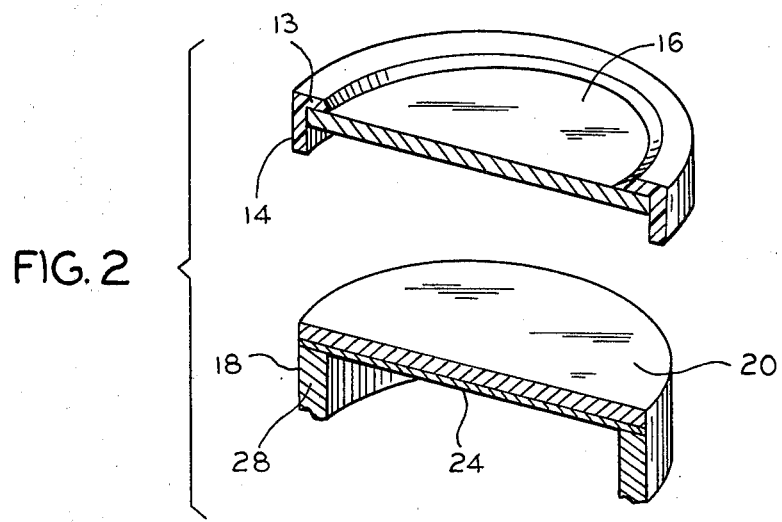
FIG. 2 is a cross-sectional view of the overcap ring removed from the container in accordance to the present invention.

As is illustrated in FIGS. 1 and 2, the upper marginal portion of the cylindrical container body 18 includes a sidewall 28 and the rim 26. The container sidewall 28 may be formed of paperboard, metal, glass, plastic or any other suitable material. The downwardly depending flange portion 14 of the overcap ring R has an inner surface which is adapted for frictional engagement with the outer surface area 32 of the upper marginal portion of the container body 28 adjacent the rim 26. The depending flange portion 14 and the outer surface area 32 define interlocking engagement means for retaining in place the overcap ring R to the container body 18 for re-use purposes. The overcap ring may be formed of a high or low density polyethylene, polypropylene, or other resilient plastic material which can be injected molded with the laminated structure.

Figure 3:
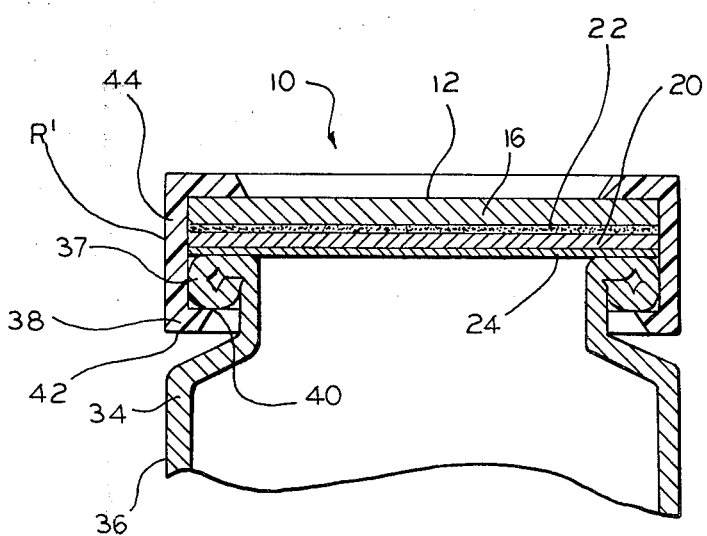
FIG. 3 is a cross-sectional view of the closure assembly secured to a second container embodiment in accordance to the present invention.

In another embodiment as is shown in FIG. 3, a sidewall 34 of a container body 36 is provided at its upper marginal portion with an outwardly rolled rim 37 projecting radially outwardly from the sidewall 34. Further, the overcap ring R' incudes an annular lip 38 with an upper inner edge 40 and a lower inner edge 42. The annular lip 38 is formed integrally with a depending flange portion 44 and projects radially inwardly. This latter interlocking engagement means is of the type described and claimed in co-pending application entitled "Peelable, Sealable Closure Arrangement" and filed in the name Charles R. Helms, which is assigned to the same assignee of this application.

Figure 4:
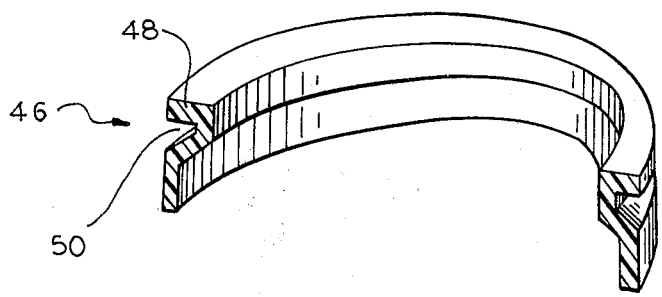
FIGS. 4 through 7 are alternative embodiments of the rim configuration in the container of the present invention.
Figure 5:
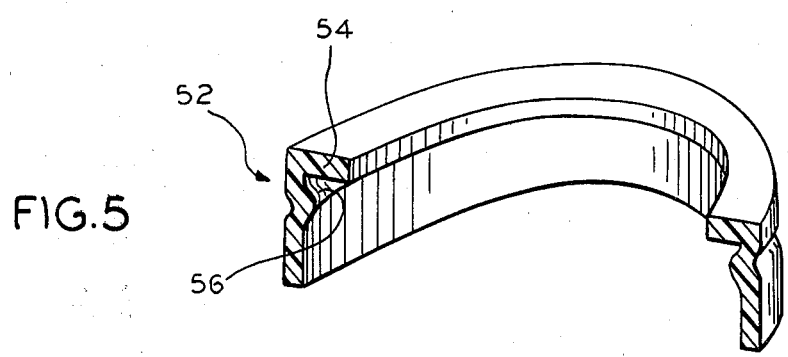
Figure 6:
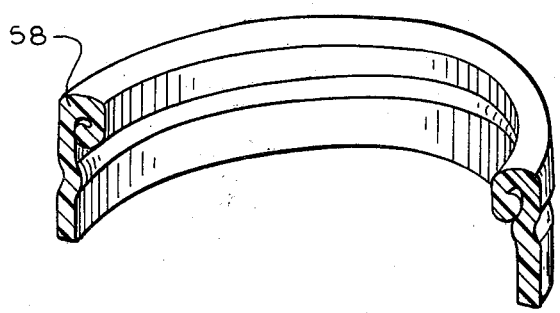
Figure 7:
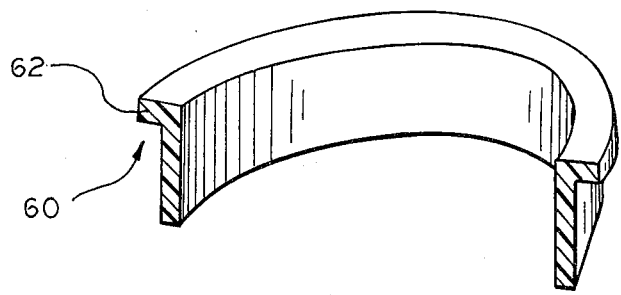

While the upper marginal portion of the cylindrical container body 18 has a straight walled rim 26 as shown in FIG. 1 and the upper marginal portion of the cylindrical container body 36 has an outwardly rolled rim 37 as shown in FIG. 3, it should be understood that the rim configuration could be formed in the manner illustrated in FIGS. 4 through 7. In FIG. 4, the rim 46 is formed to have a radially outwardly extending portion 48 with a recess 50. In FIG. 5, the rim 52 has a radially inwardly extending portion 54 with a recess 56. In FIG. 6, the rim 58 is formed to be rolled inwardly. In FIG. 7, the rim 60 has a radially outwardly extending portion 62.

As should be clearly understood from FIGS. 1 and 3, the single-piece closure arrangement 10 is formed to be an overcap ring with an integral, peelable laminated structure by the process of insert injection molding. Subsequent thereto, the closure arrangement 10 is positioned on the mouth opening end of the container body for induction heat sealing of the distal portion of the second surface of the coating layer 24 to the container rim. In order to open such a sealed container, the overcap ring is removed by resiliently releasing the flange portion from the container rim and lifting of the overcap ring upwardly. Removal of the overcap ring may cause the laminated structure 12 or a portion thereof to be separated from the container rim dependent upon the relative thickness and type of materials used in forming the laminated structure.

In one embodiment, the coating layer 22 is a tacky wax film and the coating layer 24 is a releasable, heat sealing material. In this embodiment, lifting of the overcap ring from the container body breaks a weak bonding between the coating layer 24 and the container rim so that the entire laminated structure 12 is peeled off from the container rim leaving no residue thereon and remains completely inside the overcap ring. For reuse purposes, the overcap ring may be then reapplied over the mouth opening end of the container to protect the partially depleted contents thereof.

In another embodiment, the coating layer 22 is a weak adhesive and the coating layer 24 is a releasable, heat sealing material. In this second embodiment as is shown in FIG. 2, the electrically conductive layer 20 and the coating layer 24 of the laminated structure 12 remain adhered to top of the container rim 26 upon removal of the overcap ring R. This is because of the bonding strength between the first surface of the foil 20 and the coating 22 is weaker than the bonding strength between the coating layer 24 and the container rim 26.

In still another embodiment, the coating layer 22 is a non-peelable adhesive and the coating layer 24 is a peelably attached film. In this third embodiment, only the coating layer 24 of the laminate structure 12 remains upon the top of the container rim upon removal of the overcap ring. This is due to the fact that the bonding strength between the coating layer 24 and the second surface of the foil 20 is made to be weaker than the bonding strength between the coating layer 24 and the container rim.

From the foregoing detailed description, it can thus be seen that the present invention provides a new and improved overcap ring with an integral peelable laminated structure which is formed by insert injection molding and is readily adapted for induction heat sealing to a container. Further, the entire laminated structure or a portion thereof may become separated from the container rim upon removal of the overcap ring.

While there has been illustrated and described what is at present to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best modes contemplated for carrying out this invention, but that the invention will include all embodiments falling within the scope of the appended claims.

What is claimed is:

1. The closure assembly for a container comprising:
   a container body having an upper, open marginal portion;
   an overcap ring adapted for engagement with said container body and including a generally planar portion and a downwardly depending flange portion;
   a laminated structure consisting of
   (a) a paperboard substrate having an undersurface,
   (b) an electrically conductive layer having first and second surfaces,
   (c) a first coating layer having first and second surfaces, the first surface thereof being bonded to the first surface of said conductive layer, and the second surface thereof being bonded to the undersurface of said paperboard substrate, and
   (d) a second coating layer having first and second surfaces, the first surface thereof being bonded to said second surface of said conductive layer;
   said overcap ring being injection molded to said laminated structure to provide an integral peelable laminated structure; and
   interlocking engagement means disposed on said overcap ring and said container body for maintaining said overcap ring and container body in sealing engagement.

2. A closure assembly as claimed in claim 1, wherein said electrically conductive layer comprises a metal foil disc.

3. A closure assembly as claimed in claim 1, wherein said first coating layer is a tacky wax and said second coating layer is a releasable heat sealing material.

4. A closure assembly as claimed in claim 1, wherein said first coating layer is a weak adhesive and said second coating layer is a releasable heat sealing material.

5. A closure assembly as claimed in claim 1, wherein said first coating is a non-peelable adhesive and said second coating layer is a peelably, attached film.

6. A closure assembly as claimed in claim 1, wherein said upper, open marginal portion of said container body has a radially outwardly extending rim.

7. A closure assembly as claimed in claim 1, wherein said upper, open marginal portion of said container body has a radially inwardly extending rim portion with a recess.

8. A closure assembly as claimed in claim 1, wherein said upper, open marginal portion of said container body has an inwardly rolled rim.

9. A closure assembly as claimed in claim 1, wherein said upper, open marginal portion of said container body has an outwardly rolled rim.

10. A closure assembly as claimed in claim 1, wherein said upper, open marginal portion of said container body has a straight walled rim.

11. A closure assembly adapted to be heat sealed to a container comprising:

a laminated structure consisting of
- (a) a primary substrate having an upper surface and an under surface,
- (b) an electrically conductive layer having first and second surfaces,
- (c) a first coating layer disposed between said under surface of said primary substrate and said first surface of said conductive layer, and
- (d) a second coating layer disposed on said second surface of said conductive layer and adapted for bonding said conductive layer to a container rim; and an overcap ring being injected molded to said laminated structure, said overcap ring having a generally planar portion bonded to said upper surface of said primary substrate.

12. A closure assembly as claimed in claim 11, wherein said first coating layer comprises a weak adhesive so that removal of said overcap ring from the container rim will cause the conductive layer to remain on the container rim.

13. A closure assembly as claimed in claim 11, wherein said first coating layer comprises a tacky wax so that removal of said overcap ring from the container rim will peel the conductive layer from the container rim.

14. A closure assembly as claimed in claim 11, wherein said second coating layer is a releasable heat sealing material so that removal of said overcap ring from the container rim will cause the laminated structure to remain inside the overcap ring.

15. A closure assembly as claimed in claim 11, wherein said second coating layer is a peelably, attached film so that removal of said overcap ring from the container rim will cause the second coating layer to remain on the container rim.

* * * * *